(12) United States Patent
Oklejas, III

(10) Patent No.: US 9,297,926 B1
(45) Date of Patent: Mar. 29, 2016

(54) TORNADO DATA ACQUISITION SYSTEM

(71) Applicant: Eli V. Oklejas, III, Newport, MI (US)

(72) Inventor: Eli V. Oklejas, III, Newport, MI (US)

( * ) Notice: Subject to any disclaimer, the term of this patent is extended or adjusted under 35 U.S.C. 154(b) by 195 days.

(21) Appl. No.: 14/200,257

(22) Filed: Mar. 7, 2014

Related U.S. Application Data

(60) Provisional application No. 61/775,831, filed on Mar. 11, 2013.

(51) Int. Cl.
*G01W 1/00* (2006.01)
*G01W 1/02* (2006.01)

(52) U.S. Cl.
CPC ........................ *G01W 1/02* (2013.01)

(58) Field of Classification Search
CPC . G01W 1/08; G01W 1/00; G01N 2001/2223; G01F 13/02
USPC ................. 73/170.28, 170.16, 28.01, 29.02, 73/170.01
See application file for complete search history.

(56) References Cited

U.S. PATENT DOCUMENTS

| | | | |
|---|---|---|---|
| 6,941,806 B2 * | 9/2005 | Burns | ...................... G01N 1/26 73/170.01 |
| 2009/0266283 A1 * | 10/2009 | Wrage | ................ B63H 9/0685 114/102.12 |

* cited by examiner

*Primary Examiner* — Lisa Caputo
*Assistant Examiner* — Nigel Plumb
(74) *Attorney, Agent, or Firm* — Harness, Dickey & Pierce, P.L.C.

(57) ABSTRACT

A tornado data acquisition system comprises a kite having a cable coupled thereto. The data acquisition also includes a winch rope rotatably coupled to a mounting plate and a sensor module coupled to the kite. The sensor module comprises a plurality of sensors for generating sensor signals corresponding to tornado characteristics. A data acquisition system wirelessly receives the sensor signals and stores the data corresponding to the sensor signals in a memory.

20 Claims, 6 Drawing Sheets

TORNADO DATA ACQUISITION SYSTEM

CROSS-REFERENCE TO RELATED APPLICATIONS

This application claims the benefit of U.S. Provisional Application No. 61/775,831 filed on Mar. 11, 2013. The disclosure of the above application is incorporated herein by reference.

TECHNICAL FIELD

The present disclosure relates generally to weather data collection and, more specifically, to a system for measuring data from a tornado.

BACKGROUND

The statements in this section merely provide background information related to the present disclosure and may not constitute prior art.

Tornadoes can cause extensive property damage as well as human injury and even loss of life. Typically, tornadoes are forecast using radar weather data. Although much is known about tornadoes, there is a considerable amount of unknown information about tornadoes. By providing improved data from a tornado, better predictions for predicting the development of tornadoes as well as the movement of tornadoes is desirable.

Further areas of applicability will become apparent from the description provided herein. It should be understood that the description and specific examples are intended for purposes of illustration only and are not intended to limit the scope of the present disclosure.

SUMMARY

This section provides a general summary of the disclosure, and is not a comprehensive disclosure of its full scope or all of its features.

The present disclosure provides a method and system for acquiring tornado data in a reliable manner.

In one aspect of the disclosure, a tornado data acquisition system comprises a kite having a cable coupled thereto. The data acquisition also includes a winch rope rotatably coupled to a mounting plate and a sensor module coupled to the kite. The sensor module comprises a plurality of sensors for generating sensor signals corresponding to tornado characteristics. A data acquisition system wirelessly receives the sensor signals and stores the data corresponding to the sensor signals in a memory.

In another aspect of the disclosure, a method for operating a tornado data acquisition system includes positioning a kite coupled to a winch in an inflow area of a tornado, measuring force on a cable coupling the kite to the winch, when the force is below a threshold, releasing the kite toward the tornado, generating sensor signals from sensors coupled within a housing coupled to the kite, said sensor signals corresponding to tornado characteristics, communicating the sensor signals to a data acquisition system and storing data corresponding to the sensor signals in a memory associated with the data acquisition system.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
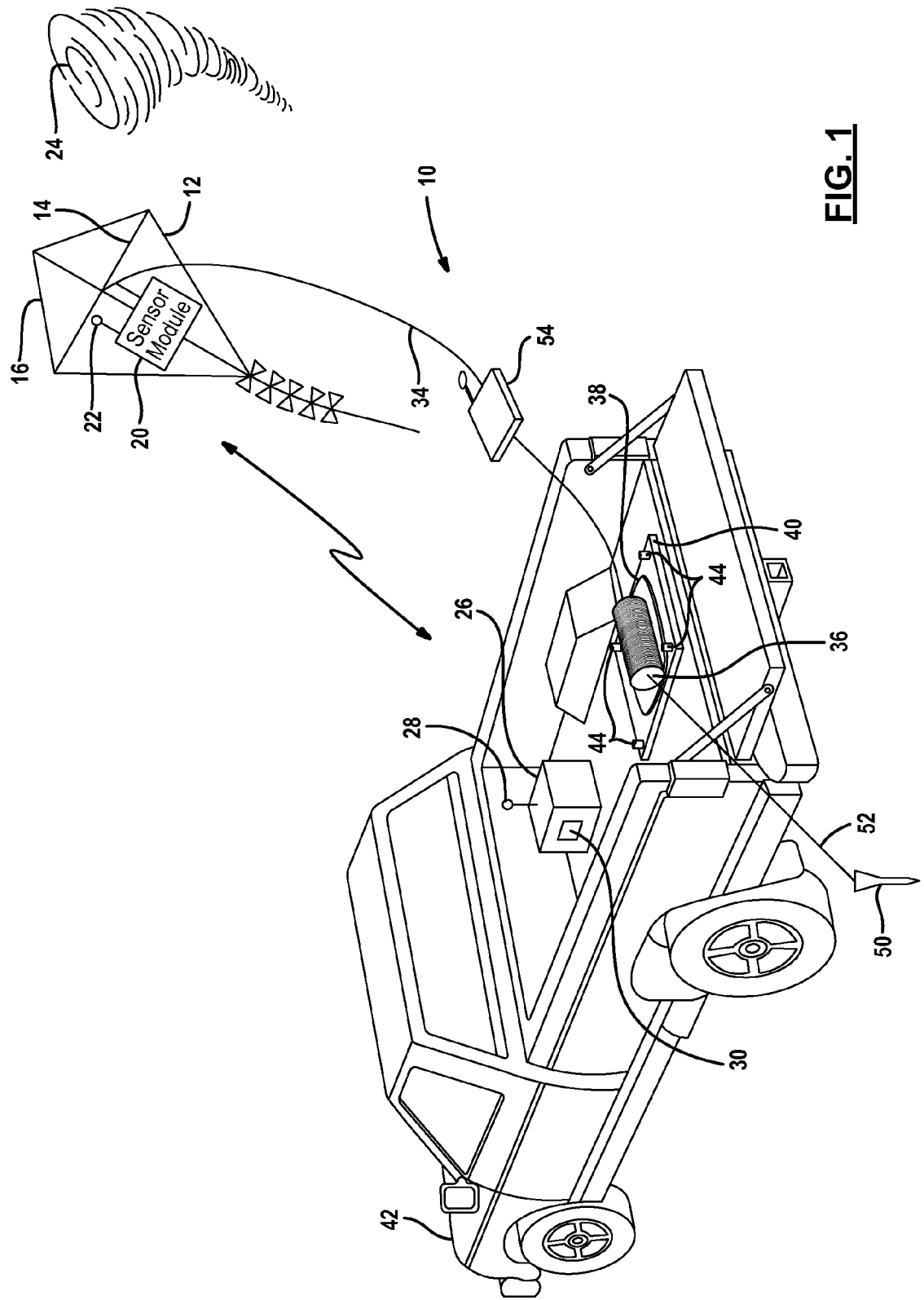
FIG. 1 is a prospective view of a tornado data acquisition according to the present disclosure.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 1, a tornado data acquisition 10 is set forth. The tornado data acquisition 10 includes a kite 12 preferably, the kite 12 is constructed of relatively strong materials and is also lightweight. In one example, the kite 12 has a frame 14 constructed of aluminum and a body 16 constructed of a tear resistant material such as Kevlar®. Various configurations and structures for the kite 12 may be used.

The kite 12 has a sensor module 20 coupled to the frame 14. The sensor module 20 is further described below in FIG. 4. The sensor module 20 may include an antenna 22 that wirelessly communicates sensor signals corresponding to the characteristics of a tornado 24 to a data acquisition system 26. The data acquisition system 26 may have an antenna 28 for receiving data and a memory 30 for storing data corresponding to the tornado characteristics as measured by the sensors within the sensor module 20.

Of course, the kite 12 and the remainder of the system must be extremely durable to prevent damage thereto during the data acquisition process. In one example, a cable 34 is used to couple the kite to a winch 36. In this example, the cable 34 is composed of an electrically conductive material such as steel. The cable may also be used to carry signals from the sensor module 20 to the data acquisition system. The winch 36 may be mounted on a turntable 38 which in turn is mounted to a mounting plate 40. The mounting plate 40 may be securely mounted to a vehicle 42 so that the kite 12 may be easily deployed. The mounting plate 40 may be positioned within a flat bed of a pickup truck. Bolts 44 may be used to mount the mounting plate 40 to the vehicle 42. In one embodiment, the mounting plate 40 was positioned to a frame or a fifth wheel plate (not shown) of the vehicle 42. By rotatably mounting the winch 36 to the turntable, the winch 36 and thus the kite 12 can be easily positioned or repositioned in case the wind changes direction.

To prevent electrical damage to the vehicle and the other parts of the tornado data acquisition system 10, a ground stake 50 in electrical communication with the winch 36 through a ground wire 52 may be used to prevent damage to the system. When deployed, the ground stake 50 is at least partially staked into the ground.

A force sensor 54 may be positioned on the cable 34. The force sensor 54 may be positioned in various locations, such as at the interface between the cable and the kite or on the winch itself. The force sensor 54 may be used to detect whether the force is acting on the kite 12 is greater than a threshold. If the force on the kite 12 is greater than a threshold, the operator may choose not to deploy the kite to prevent damage thereto.

Figure 2:
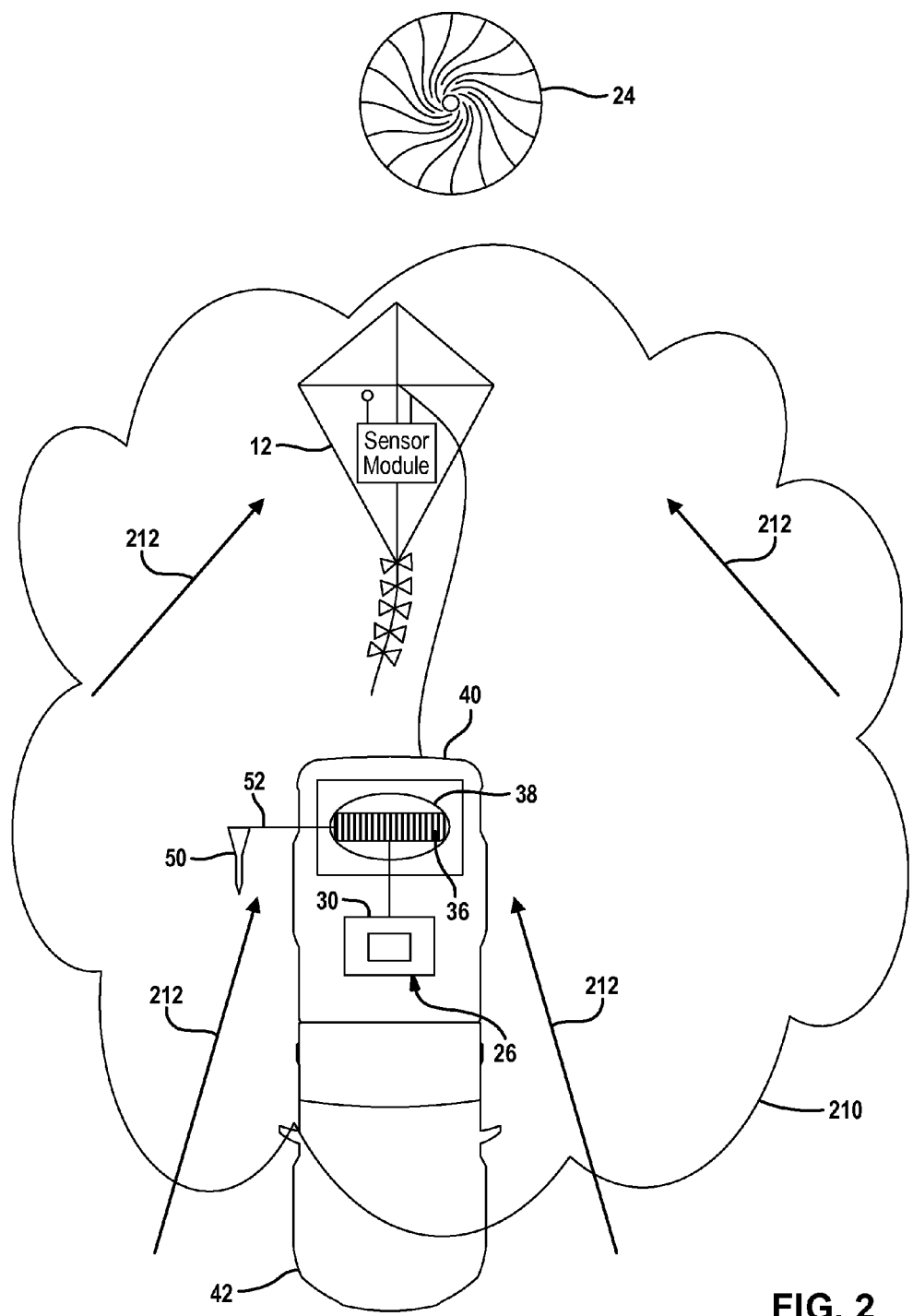
FIG. 2 is a top view of the tornado data acquisition system of claim 1.

Referring now to FIG. 2, the vehicle 42 is positioned in an inflow area 210. The arrows 212 show the direction of flow in the inflow area 210. The inflow area 210 will allow the kite 12 to remain aloft. The inflow area 210 is shown relative to the tornado 24. Should the position of the tornado 24 change, the winch 36 can easily be rotated on the turntable 38.

Figure 3:
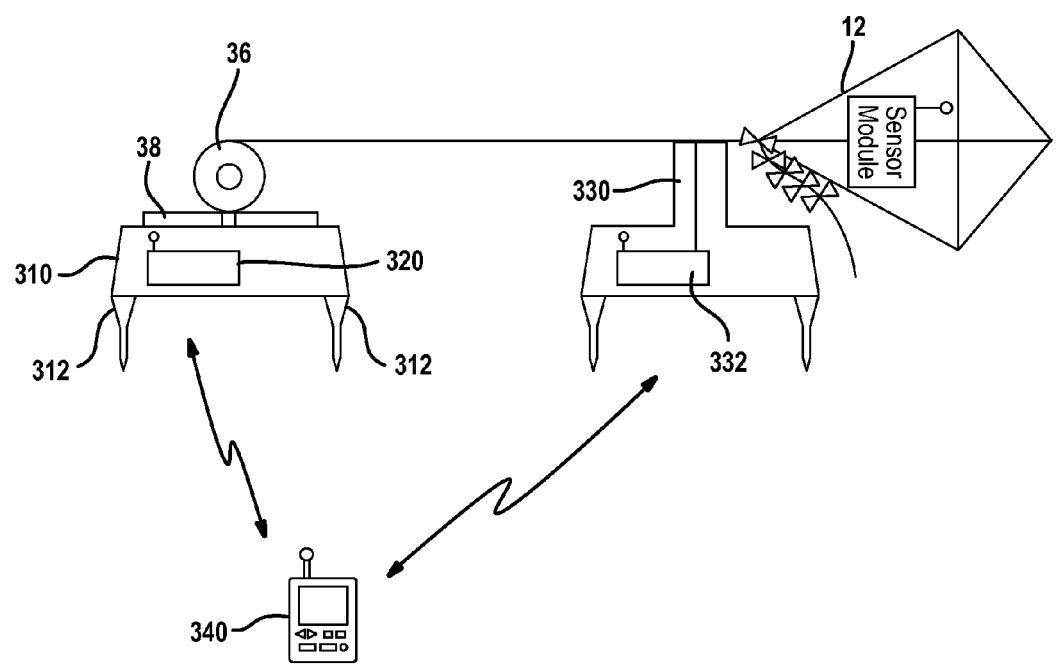
FIG. 3 is a side view of a remote tornado data acquisition launcher.

Referring now to FIG. 3, the kite 12 may also be remotely launched. The winch 36 may be mounted on a turntable 38 that is mounted to a stand 310 or removable from the vehicle 42 of FIGS. 1 and 2. The stand 310 may include legs 312 that may be mounted into the ground. A wireless controller 320 may be used to wirelessly control the unwinding and winding of the winch 36.

A remotely controlled release actuator 330 is also illustrated. The release actuator 330 has a wireless control 332 to release the kite 12 upon sensing the desirable conditions. This may be performed remotely using a remote control 340. The remote control 340 may include a keypad or other types of buttons for releasing the actuator 330 to release the kite 12 at the desired time. This may be done from a remote location to reduce potential peril of the operators of the system.

Figure 4:
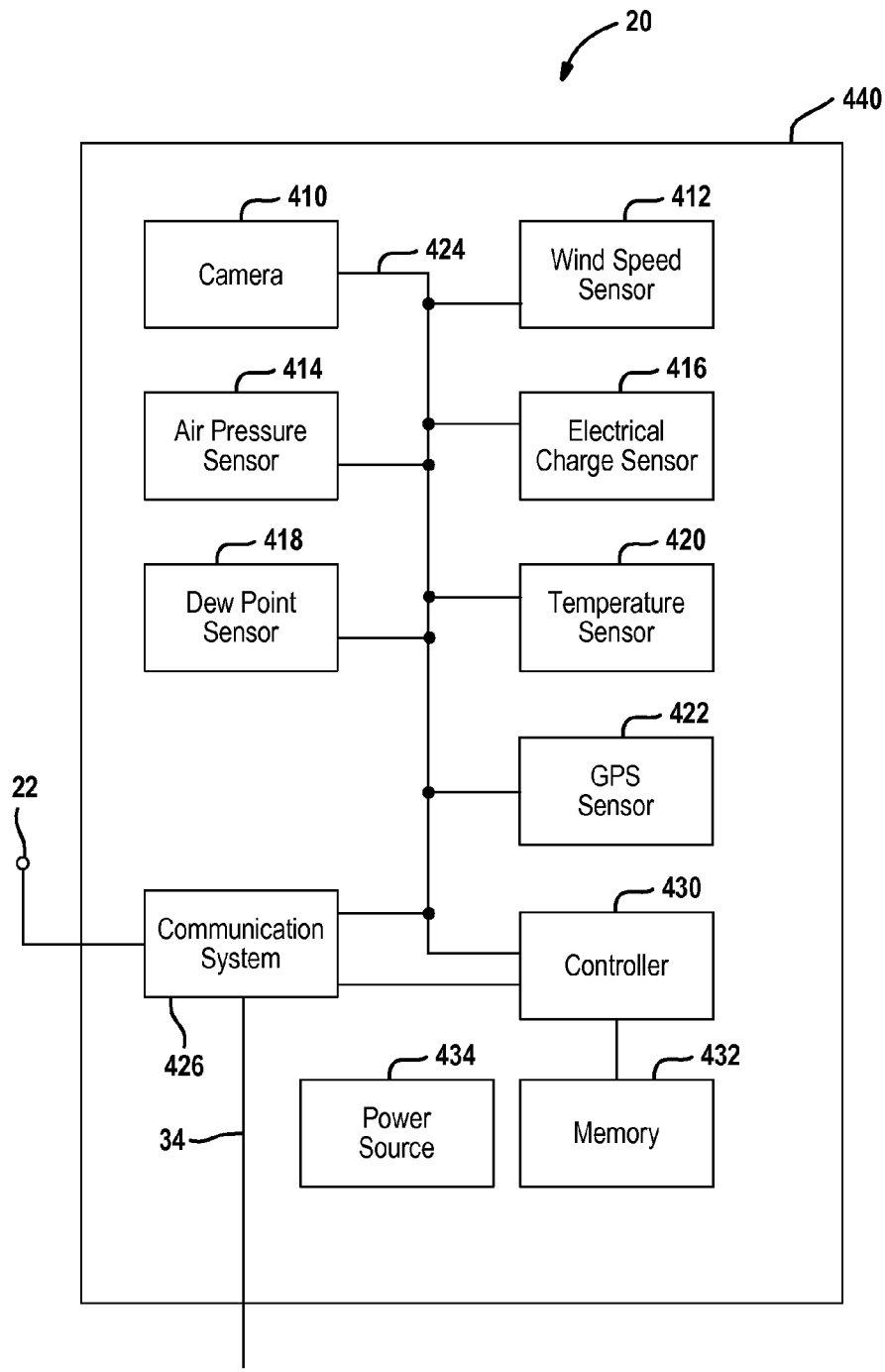
FIG. 4 is a block diagrammatic view of the sensor module of FIG. 1.

Referring now to FIG. 4, the sensor module 20 is illustrated in further detail. The sensor module 20 may include a camera 410 that generates camera signals. The camera signals may include video signals and audio signals or still pictures.

A wind speed sensor 412 may also be included within the sensor module 20. The wind speed sensor 412 generates a wind speed signal corresponding to the speed of the wind within the tornado.

The sensor module 20 may also include an air pressure sensor 414 generating an air pressure signal corresponding to the air pressure within the tornado.

The sensor module 20 may also include an electrical charge sensor 416 generating an electrical charge signal corresponding to the electrical charge within the tornado.

The sensor module 20 may also include a dew point sensor 418. The dew point sensor 418 generates a dew point signal corresponding to the dew point within the tornado.

A temperature sensor 420 may also be included within the sensor module 20. The temperature sensor 420 generates a temperature signal corresponding to the temperature of the tornado.

A GPS sensor 422 may also be included within the sensor module 20. The GPS sensor 422 provides GPS data to a data acquisition system. The GPS data may transmit positions as well as altitude of the kite. By communicating a position, the kite may be easily retrieved if the kite comes free.

All of the sensors may be in communication directly or through a bus 424 to a communication system 426. The communication system is an electrical communication with the antenna 22 or to the cable 34. A controller 430 may be used to control the operation of a tornado data acquisition system. A memory 432 may be used to store data from the various sensors. The memory 432 may also act as a buffer if the speed of the link between the communication system 426 and the data acquisition system is not fast enough to communicate the data in real time.

The sensor module 20 may be enclosed within a housing 440. The housing 440 may be formed from bulletproof glass or other strong material to withstand the extreme conditions likely to be encountered within a tornado.

The sensor module 20 may also include a power source 434, such as a battery, for powering the different sensors and components within the housing 440. The individual connections to the various components are not shown for simplicity.

Figure 5:
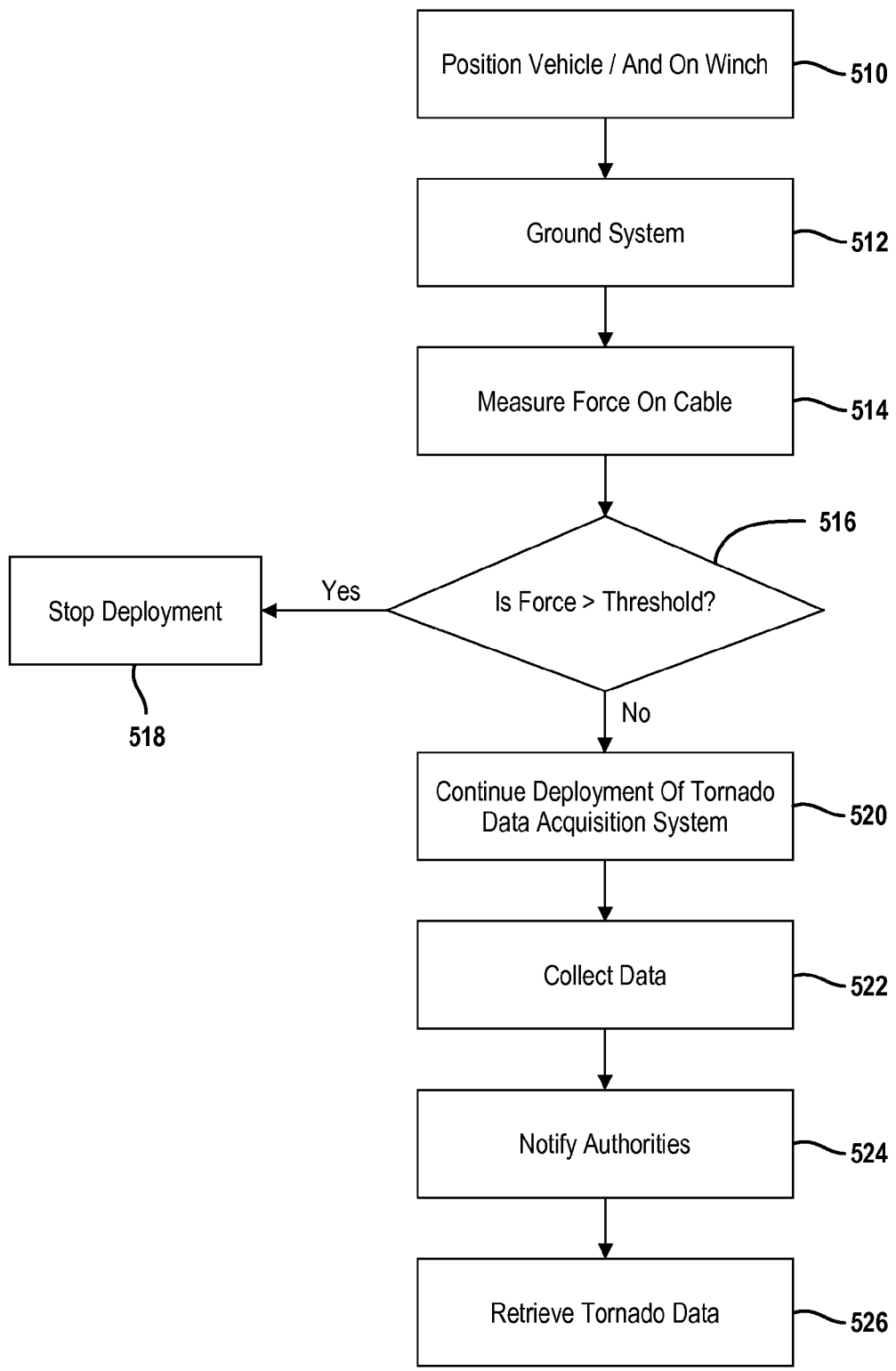
FIG. 5 is a flow chart of a method for operating the tornado data acquisition system.

Referring now to FIG. 5, a method for operating the tornado data acquisition system is set forth. In step 510, the vehicle and the winch 36 are positioned. One example of positioning the vehicle is illustrated in FIG. 2 above. Based upon weather forecasts the tornado acquisition system and thus the vehicle is positioned in a desirable area for contacting a tornado. The storm may be monitored. The operator will determine the inflow area of the tornado and position the vehicle with winch 36 and/or the remote mounting stand in this area. If the vehicle is used, the vehicle may be parked pointing into the wind to keep the pull of the cable from pulling the vehicle in a sideways direction.

In step 512 the system is grounded. As mentioned above, grounding may take place by using the ground stake 50 and ground. In step 514, when the tornado is in close proximity to the kite, the force on the cable is measured. In step 516 the force is compared to a threshold. When the force is greater than a threshold, step 518 stops the deployment because the force may be too great for the system.

Referring back to step 516, when the force is not greater than a threshold, it is safe to deploy the kite. After step 516, step 520 continues the deployment of the tornado data acquisition and the kite. The sensors are positioned on the kite and are used to collect data in step 522. The data may be wirelessly transmitted or transmitted through the cable to the data acquisition system. The data may be analyzed immediately by an operator. Authorities may be notified in step 524 with various information including the direction of the storm and the severity of the storm. This may allow the emergency officials to deploy the proper resources when the storm threat has passed.

In step 526, the tornado data acquisition system may then be retrieved. That is, the winch may be reeled in and the kite connected to the cable may be retrieved. The sensors on the kite may also be retrieved in step 526.

By monitoring the sensor data from various tornadoes, further conclusions may be drawn regarding tornadoes. The data may also be immediately used to predict the storm path and alert authorities. By providing a quick method for deploying the kite using the winch, rapid deployment of one or more than one system may be performed.

Figure 6:
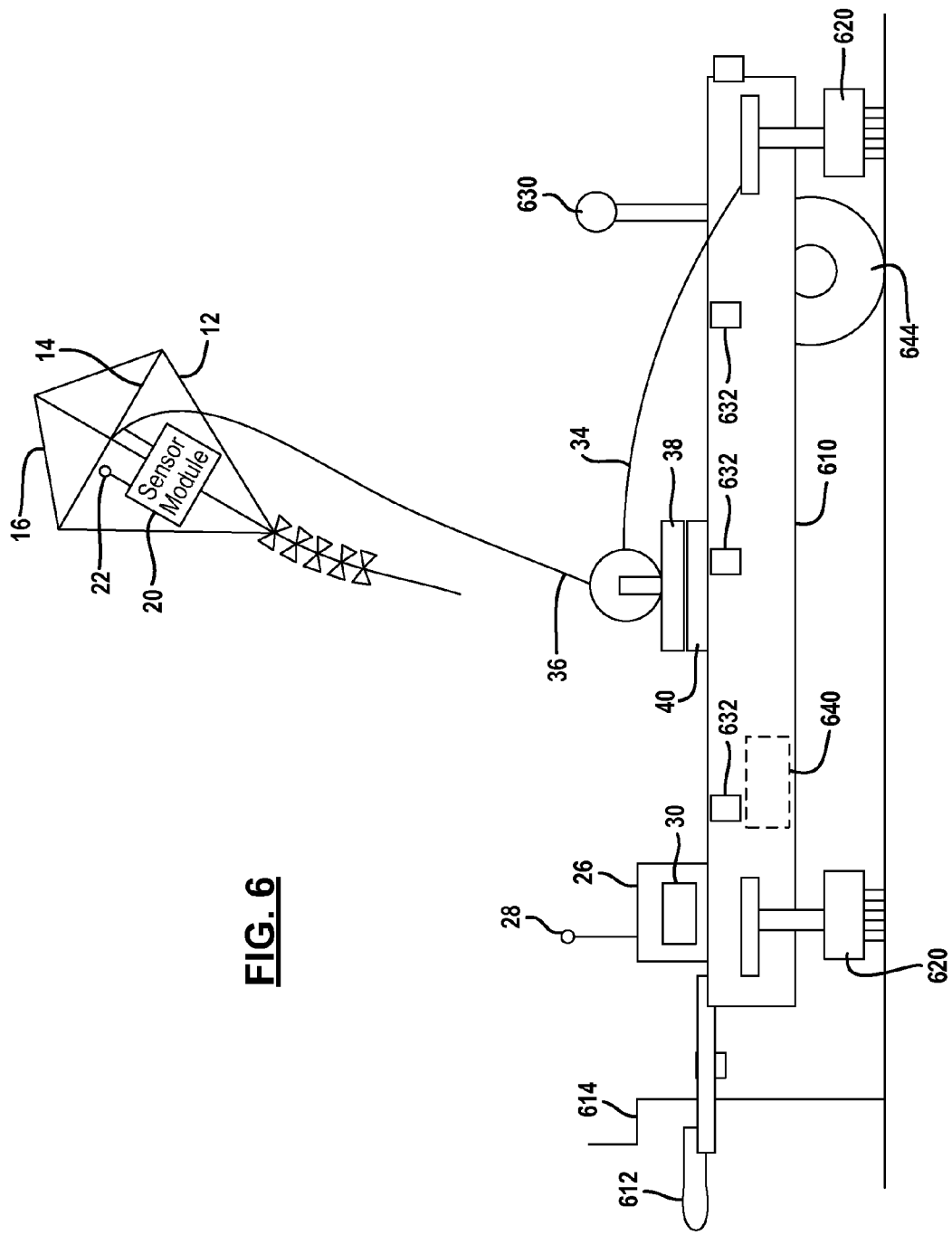
FIG. 6 is a trailer for deploying the tornado acquisition system.

Referring now to FIG. 6, a trailer 610 may be used to deploy the kite 12 and the sensor module 20 deployed thereon. The trailer 610 is towed to a predicted tornado path and unhitched from the vehicle at the hitch 612. A lifting crank 614 is used to lift the trailer so that it may be unhitched.

A plurality of deployment claws 620 may be deployed around the vehicle. In this example, for deployment claws 620 are provided at a respective one of the corners of the vehicle. The deployment claws are ratcheted down into the dirt or into the pavement to secure the trailer 610 in high winds. The cable 34 may be secured to one of the deployment claws 620 to act as a ground for lightning strikes.

As was described above, the winch 36 may be rotatably mounted to a turntable 38 which in turn is coupled to a mounting plate 40. In this case, the mounting plate 40 is securely coupled to the trailer 610.

The trailer may also house the data acquisition system 26 that has memory 30 and an antenna 28. Data may be collected in a similar manner to that described above.

The trailer 610 may also have some other features such as a deployment beacon 630 and a plurality of strobe marker lights 632 positioned there around. The deployment beacon and strobe marker lights may be turned on when the trailer is removed from the hitch.

A battery 640 may also be positioned on or within the trailer 610 to power the data acquisition system, the winch 36 and the like. It should be noted that the data acquisition system and the winch 36 may be activated and rotated from a remote location using a remote control device like that described in FIG. 3. The actuator of FIG. 3 that is remotely controlled may also be incorporated into the trailer 610.

The trailer 610 also has wheels 644 that are used for moving the trailer 610 from place to place.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A tornado data acquisition system comprising:
   a kite having a cable coupled thereto;
   a winch coupled to the cable and rotatably coupled to a mounting plate;
   a sensor module coupled to the kite, said sensor module comprising a plurality of sensors for generating sensor signals corresponding to tornado characteristics; and
   a data acquisition system wirelessly receiving the sensor signals and storing data corresponding to the sensor signals in a memory.

2. The system as recited in claim 1 wherein the sensor module in encased in bulletproof glass.

3. The system as recited in claim 1 wherein the sensor module comprises a camera.

4. The system as recited in claim 1 wherein the sensor module comprises a wind speed sensor.

5. The system as recited in claim 1 wherein the sensor module comprises an air pressure sensor.

6. The system as recited in claim 1 wherein the sensor module comprises an electric charge sensor.

7. The system as recited in claim 1 wherein the sensor module comprises a dew point sensor.

8. The system as recited in claim 1 wherein the sensor module comprises a camera, a wind speed sensor, an air pressure sensor, an electric charge sensor, and a dew point sensor.

9. The system as recited in claim 1 wherein the mounting plate is coupled to a vehicle.

10. The system as recited in claim 9 wherein the winch is rotatable coupled to the mounting plate.

11. The system as recited in claim 1 further comprising a remote controller actuator for releasing the kite.

12. The system as recited in claim 1 wherein the cable is composed of electrically conductive material and further comprising a ground strap coupled to the winch for grounding the system.

13. The system as recited in claim 1 wherein the kite comprises a frame composed of aluminum and a body composed of Kevlar™.

14. A method of collecting data from a tornado comprising:
    positioning a kite coupled to a winch in an inflow area of a tornado;
    measuring force on a cable coupling the kite to the winch;
    when the force is below a threshold, releasing the kite toward the tornado;
    generating sensor signals from sensors coupled within a housing coupled to the kite, said sensor signals corresponding to tornado characteristics;
    communicating the sensor signals to a data acquisition system; and
    storing data corresponding to the sensor signals in a memory associated with the data acquisition system.

15. The method as recited in claim 14 wherein positioning the kite comprises rotating a turntable.

16. The method as recited in claim 14 wherein generating the sensor signals comprises generating a camera signal and a wind speed signal.

17. The method as recited in claim 14 wherein generating the sensor signals comprises generating a camera signal, a wind speed signal and electrical charge signal.

18. The method as recited in claim 14 wherein generating the sensor signals comprises generating a camera signal, a wind speed signal, an air pressure signal, an electric charge signal and a dew point signal.

19. The method as recited in claim 14 wherein communicating comprises communicating the sensor signals through the cable coupled to the winch.

20. The method as recited in claim 14 further comprising grounding the winch.

* * * * *